F. W. MORRIS.
ELECTRICAL MEASURING INSTRUMENT.
APPLICATION FILED DEC. 24, 1912.
1,120,217.
Patented Dec. 8, 1914.
2 SHEETS—SHEET 1.
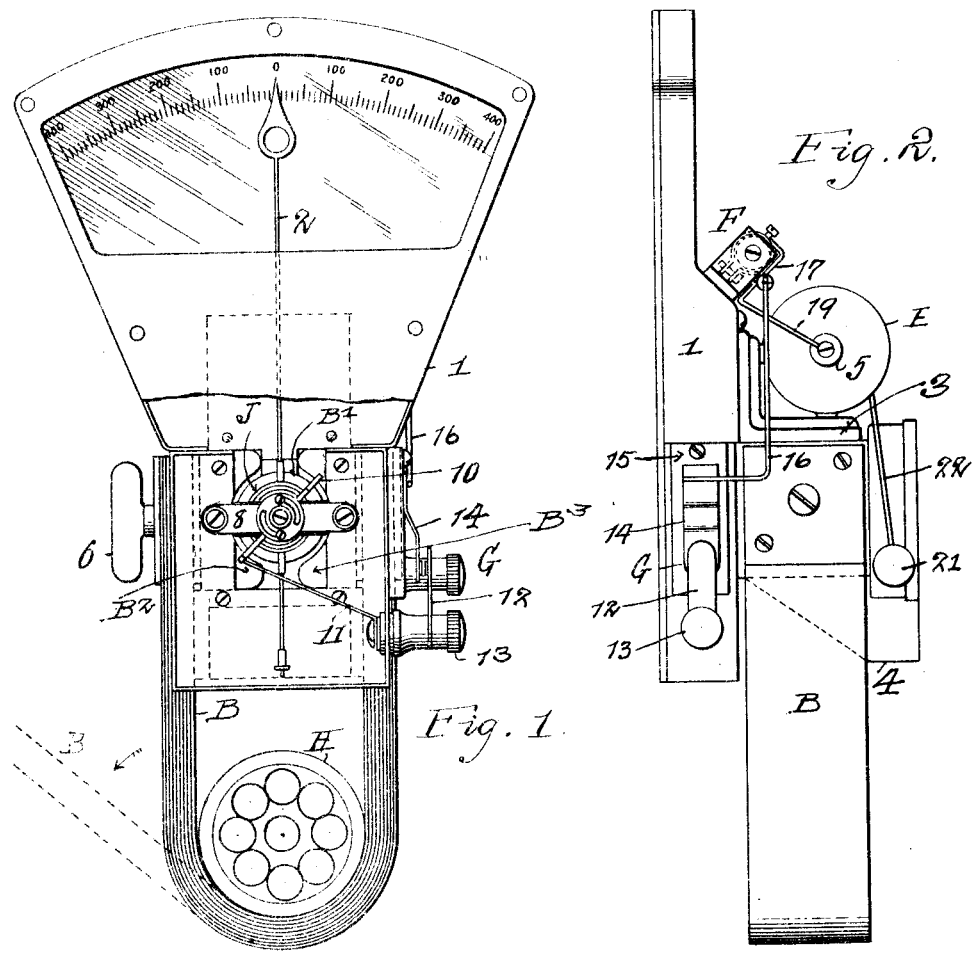

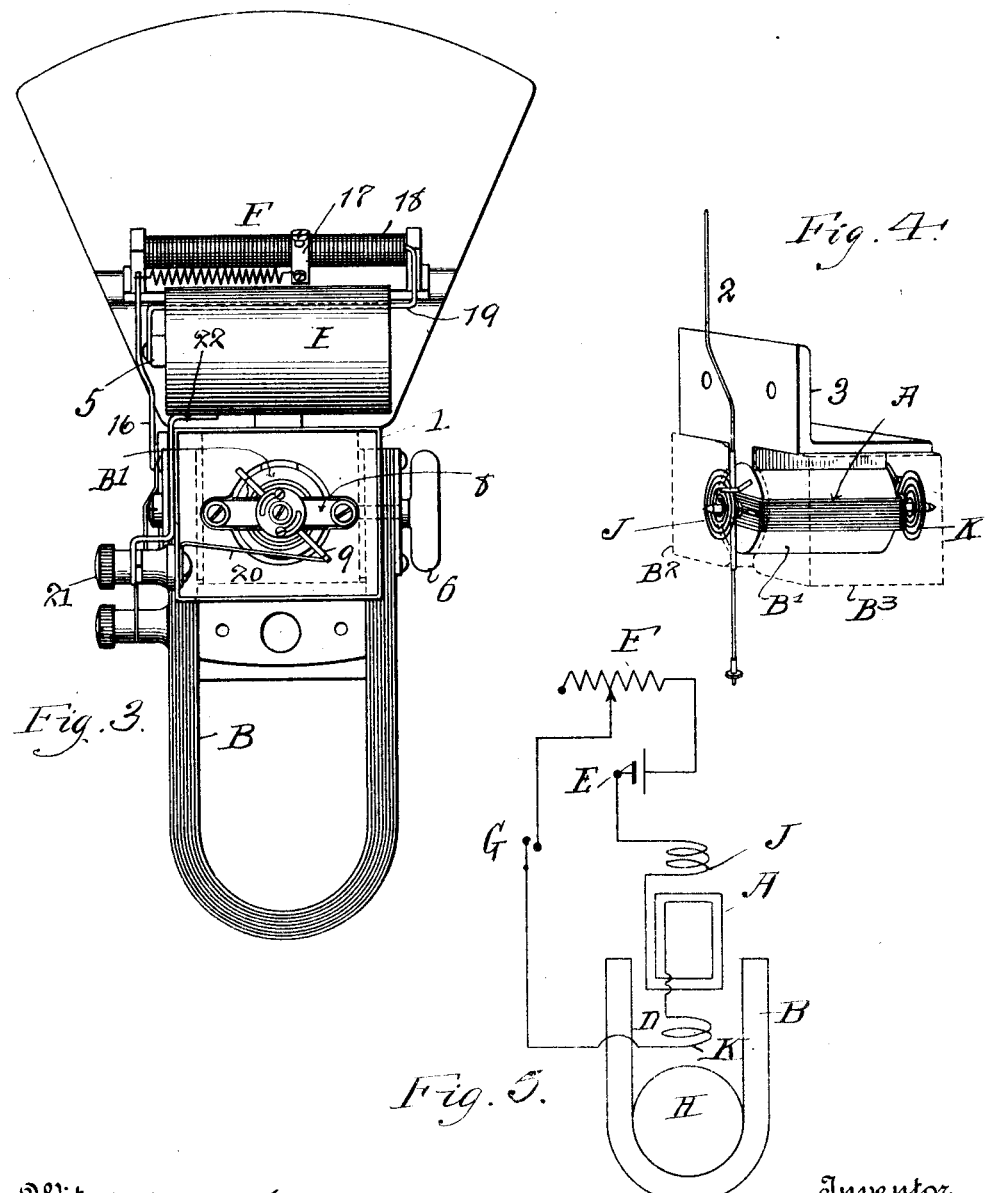

UNITED STATES PATENT OFFICE.

FREDERICK W. MORRIS, OF BROOKLYN, NEW YORK, ASSIGNOR TO THOMAS E. MURRAY, OF NEW YORK, N. Y.

ELECTRICAL MEASURING INSTRUMENT.

1,120,217. Specification of Letters Patent. Patented Dec. 8, 1914.

Application filed December 24, 1912. Serial No. 738,442.

*To all whom it may concern:*

Be it known that I, FREDERICK W. MORRIS, a citizen of the United States, residing at Brooklyn, in the county of Kings and State of New York, have invented a certain new and useful Improvement in Electrical Measuring Instruments, of which the following is a specification.

The invention is an electrical measuring instrument, wherein the current is measured by the mutual reaction of two fields, one of said fields being constant and produced around a movable member, and the other of said fields being produced by induction from a conductor separate from the instrument and conveying the current to be measured; the said second field hence being variable correspondingly to said current. The second field is preferably concentrated by a body of magnetic material preferably of high permeability, wherein the flux is generated by the current to be measured, in which body there may be an air-gap wherein the movable member may be placed. The displacement of said movable member is resiliently opposed so that said member finally takes a position of balance, and the extent of its travel in passing to said position then measures the inducing current aforesaid.

In the accompanying drawings—Figure 1 is a front elevation of my electrical measuring instrument, Fig. 2 is a side elevation, Fig. 3 is a rear elevation, Fig. 4 is a detail view in perspective, showing the coil and body of magnetic material in inductive proximity thereto, and Fig. 5 is an electrical diagram showing the circuit in the instrument.

Similar letters and numbers of reference indicate like parts.

Referring first to Fig. 5, the coil A is pivoted in inductive proximity to a body B of magnetic material. The coil terminals are connected to the volute springs J, K which oppose the angular displacement of the coil on its pivots. E is a voltaic cell of any suitable type giving a substantially constant current. One terminal of said cell is connected to volute spring J, and the other through a variable resistance F and switch G to the volute spring K, so that the circuit proceeds from cell E, to spring J, through the coil A, to spring K, to variable resistance F, and so back to cell E.

In using the instrument, the body B of magnetic material is placed in inductive proximity to the conductor conveying the current to be measured, which conductor is separate from the instrument. In Fig. 5, said conductor, indicated at H, is shown disposed between the arms of the body B which is in loop form. The coil A being located in an air-gap between the extremities of body B, is in a variable magnetic field, and is caused to turn on its pivot by reason of the mutual reaction of said field with the field due to the current traversing said coil. Inasmuch as the current in the coil is constant, or substantially so, the angular displacement of the coil against the resilient opposition of springs J, K will depend upon variations in strength of the field in which the coil is pivoted. And as this in turn depends upon the current traversing the conductor H, it follows that the extent of angular displacement of the coil will measure the strength of said current.

Referring now to the specific construction of the instrument here illustrating my invention, 1 is the inclosing case, having an opening, through which the index needle 2 and scale can be seen. On the rear side of the case are secured two brackets 3 and 4. The upper bracket 3 carries the horizontally disposed constant cell E, one terminal of which is formed by its cylindrical metal envelop. The other terminal, 5, is centrally disposed at one end of the cell. On the under side of bracket 3 is supported the cylindrical metal core B¹. Between the brackets 3 and 4 are fastened the concave blocks B², B³. The core B¹ is disposed between and in the concavities of said blocks, so that an annular space is left between said core and said blocks.

Fastened at one end to the block B² is a U-shaped laminated bar B of magnetic material. The other end of said bar is releasably secured by a removable screw 6 to the block B². The core B¹, blocks B², B³, and laminated bar B, here unitedly form a body of magnetic material, to which the coil A is in inductive proximity.

The coil A is of the usual construction in well-known instruments of the type disclosed in Letters Patent No. 392,387, granted to Edward Weston, Nov. 6, 1888. It surrounds the core B¹, is disposed in the annular space between said core and the blocks B², B³ and is pivoted in bars 8 extending between said blocks. The coil terminals are connected to the volute springs J, K, and the ends of said springs are connected to the pivoted arms 9, 10, by means of which the resiliency of said springs and hence the opposition offered by them to the angular displacement of the coil may be adjusted, all as in the Weston instrument aforesaid. The arm 10, Fig. 1, is connected by wire 11 to the leaf spring contact 12 on post 13. Another spring contact 14, secured to a plate 15 of insulating material fastened to the side of the case, is connected by wire 16 to the movable member 17 of the variable resistance F, which is supported on a shoulder formed on the back of the case. The fixed coil 18 of said resistance is connected by wire 19 to terminal 5 of cell E, Fig. 3. The arm 9 is connected by wire 20 to binding post 21, which is connected by wire 22 to the tubular metallic envelop of cell E. The function of the variable resistance in instruments of this type is already well understood. The function of the spring switch G formed by contacts 12 and 14 is to keep the circuit in the instrument normally open, and thus avoid exhaustion of the cell. The index needle 2 is secured to coil A and extends over the scale which is marked in suitable units of measurement, such as volts.

The laminated bar B is flexible, and when the screw 6 is withdrawn from the block B², the end of said bar, secured by said screw, may be separated from said block, as indicated in dotted lines, Fig. 1, so as to allow the conductor H, shown in Fig. 1 as a cable and carrying the current to be measured, to be placed within the loop of said bar. The end of the bar is then re-secured to block B².

The varying current on conductor H causes a flux in bar B and blocks B², B³, forming part of the same magnetic structure, whereby a strong variable field is produced in the annular space between blocks B², B³. The constant current from cell E traversing coil A produces a constant field which, coacting with the variable field, causes the coil A to be angularly displaced to a point where the resilient action of the two fields is balanced by the resiliency of the springs J, K, and this displacement, as indicated by the index needle 2, is read in terms of the units marked on the scale.

It is to be noted that this instrument has no exterior terminals connected to it, since it obtains its variable field solely by induction. It is, therefore, especially adapted to the measurement of current on the cables and other leads of power, electric lighting and like installations, inasmuch as it can be applied to a lead at any exposed point along the length thereof, without requiring any opening of the circuit.

The bar B should be of high magnetic permeability. It is here laminated to reduce residual magnetism. Any remaining in it is compensated for by suitable scale corrections.

I claim:

1. An electrical measuring instrument, comprising a movable member, means for resiliently opposing the movement of said member, and means for controlling the movement of the movable member adapted to be energized by a flux surrounding a conductor separate from the instrument, the current upon which conductor is to be measured.

2. An electrical measuring instrument, comprising a movable member, means for resiliently opposing the movement of said member, means for controlling the movement of the movable member adapted to be energized by a flux surrounding a conductor separate from the instrument, the current upon which conductor is to be measured, and means for indicating the displacement of said movable member.

3. An electrical measuring instrument, comprising means for producing a constant field, means adapted to be energized by a flux surrounding a conductor separate from the instrument, the current upon which conductor is to be measured to produce a second field, and a movable member disposed in both fields and adapted to be displaced by their mutual reaction.

4. An electrical measuring instrument, comprising a movable member, means for energizing said member to produce a constant field, means for resiliently opposing the movement of said member, a fixed member disposed in said field and adapted to be energized by a flux surrounding a conductor separate from the instrument, the current upon which conductor is to be measured, to produce a second field, and means for indicating the displacement of said movable member due to the mutual reaction of said fields.

5. An electrical measuring instrument, comprising a coil rotary on a diametral axis, means for resiliently opposing the movement of said coil, a current generator in circuit with said coil, and a body of magnetic material in inductive proximity to said coil and adapted to be energized by a flux surrounding a conductor separate from the instrument, the current upon which conductor is to be measured.

6. An electrical measuring instrument, comprising a body of magnetic material in loop form adapted to be energized by a flux surrounding a conductor separate from the instrument, the current upon which conductor is to be measured, a coil rotary on a diametral axis interposed between the arms of said loop, and a current generator in circuit with said coil.

7. An electrical measuring instrument, comprising a body of magnetic material adapted to be energized by a flux surrounding a conductor separate from the instrument, the current upon which conductor is to be measured, and having an air gap, a pivoted coil in said gap, means for resiliently opposing the angular displacement of said coil, and a current generator in circuit with said coil.

8. An electrical measuring instrument, comprising a support, two blocks of magnetic material thereon having concavities in their opposing faces, a U-shaped bar of magnetic material secured at one of its ends to one of said blocks and having its other end releasably connected to the other of said blocks and adapted to be energized by a flux surrounding a conductor separate from the instrument, the current upon which conductor is to be measured, a coil pivoted in said concavities, means for resiliently opposing the movement of said coil, and a current generator in circuit with said coil.

9. An electric measuring instrument, comprising a body of magnetic material, a moving coil in inductive proximity thereto, and means for placing said body in inductive relation with a conductor separate from the instrument so as to measure the current passing through said conductor.

In testimony whereof I have affixed my signature in presence of two witnesses.

FREDERICK W. MORRIS.

Witnesses:
GERTRUDE T. PORTER,
MAY T. MCGARRY.